United States Patent [19]

Breher

[11] Patent Number: 5,006,096
[45] Date of Patent: Apr. 9, 1991

[54] BELT DRIVE COMPRISING A TOOTHED BELT AND A TOOTHED PULLEY

[75] Inventor: Rudolf Breher, Porta Westfalica, Fed. Rep. of Germany

[73] Assignee: Breco Kunststoffverarbeitungs-GmbH & Co. KG, Porta Westfalica, Fed. Rep. of Germany

[21] Appl. No.: 494,179

[22] Filed: Mar. 14, 1990

[30] Foreign Application Priority Data

Mar. 25, 1989 [DE] Fed. Rep. of Germany ....... 3909950

[51] Int. Cl.$^5$ .............................................. F16H 7/02
[52] U.S. Cl. .................................... 474/153; 474/205
[58] Field of Search ............... 474/152, 153, 167, 204, 474/205, 238

[56] References Cited

U.S. PATENT DOCUMENTS

| | | | |
|---|---|---|---|
| 2,770,977 | 11/1956 | Beckadolph et al. | 474/153 X |
| 3,338,107 | 8/1967 | Kiekhaefer | 474/153 |
| 4,545,778 | 10/1985 | Koivula | 474/153 |
| 4,571,224 | 2/1986 | Arinaga | 474/153 |

FOREIGN PATENT DOCUMENTS

| | | | |
|---|---|---|---|
| 3327085 | 3/1984 | Fed. Rep. of Germany | 474/153 |
| 60-157551 | 8/1985 | Japan | 474/153 |
| 2124729 | 2/1984 | United Kingdom | 474/153 |

*Primary Examiner*—Thuy M. Bui
*Attorney, Agent, or Firm*—Robert W. Becker & Associates

[57] ABSTRACT

A belt drive comprising a toothed belt and a toothed pulley. The belt has teeth that are divided into at least two strip-like rows that are disposed next to one another, with the rows being offset relative to one another in the longitudinal direction of the belt in such a way that the teeth of one row are disposed at least partially laterally adjacent to the grooves between the teeth of the adjacent row. In conformity with the number and offset of the rows of the teeth of the belt, the toothed pulley comprises at least two pulley sections that are staggered relative to one another and are connected to one another.

3 Claims, 1 Drawing Sheet

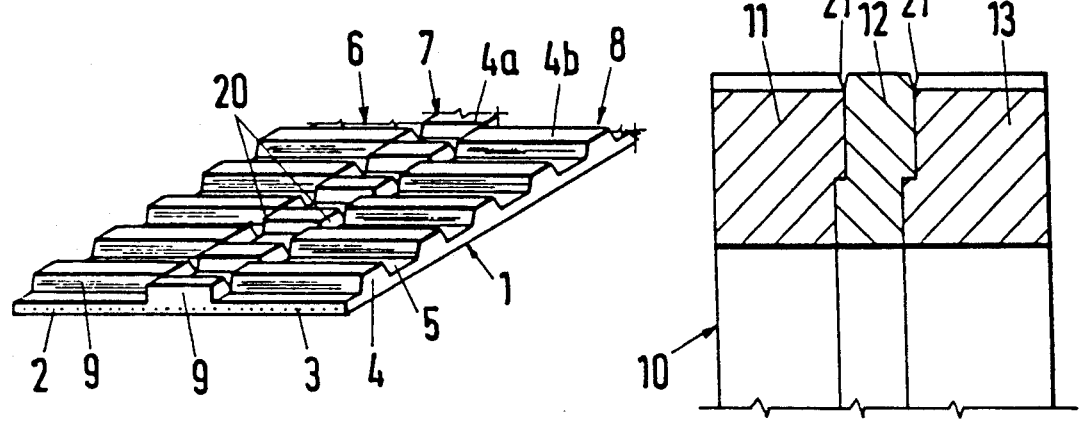
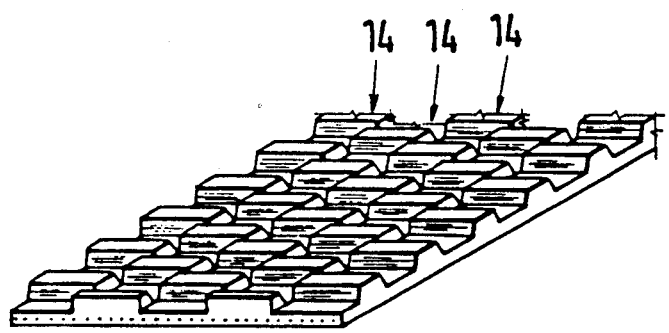
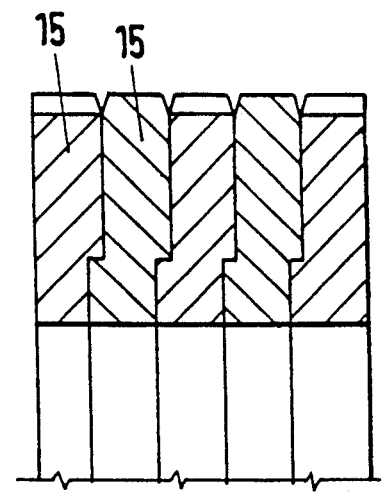

BELT DRIVE COMPRISING A TOOTHED BELT AND A TOOTHED PULLEY

BACKGROUND OF THE INVENTION

The present invention relates to a belt drive comprising a toothed belt and a toothed pulley, with the toothed belt having a toothed side on which are formed guide surfaces that are disposed along a line that extends in the longitudinal direction of the toothed belt, with the guide surfaces extending transverse to the teeth and grooves of the belt, whereby when the belt rotates about the toothed pulley, in order to provide lateral guidance for the belt the guide surfaces rest against corresponding abutment surfaces of the toothed pulley that extend transverse to the teeth of the pulley.

Normally, as toothed belts rotate about a toothed pulley, they are guided on the sides by lateral flanges of the toothed pulley. However, there are also toothed belt drives, for example where the toothed belt is used as a transport member in conveying units, where the toothed pulley cannot have flanges that project laterally beyond the toothed belt. For this purpose (see for example U.S. Pat. No. 2,770,977), a self-guiding toothed belt is known where a strip-like guide rib is disposed along the center line of the toothed side of the belt, with this guide rib engaging in a conforming annular groove on the center of the toothed peripheral surface of the pulley, or where conversely the toothed side of the belt is split into two rows of teeth by a guide groove that extends in the longitudinal direction of the belt, and a circumferential rib of the toothed pulley engages this groove; as a result, the toothed belt can also be laterally guided on the toothed pulley without flanges. However, a drawback of this heretofore known toothed belt is that the strip-like guide rib of the belt must be compressed on the curved inner side of the toothed belt as the belt rotates about the pulley. Despite the notches that are provided on the guide rib of the known toothed belt, this adversely affects the desired soft flexibility of the belt, and leads to an unfavorable operating behavior of the belt on the pulley. The known toothed belt has the particular drawback that as a consequence of the strip-like guide rib, or also due to the longitudinally extending guide groove of the belt, the force transfer surface on the surfaces of the teeth of the belt is reduced, so that in order to be able to transfer the same drive power as was possible without the guide rib or guide groove, the toothed belt must be made wider, which makes the belt more expensive and as a consequence of which the belt also rotates about the pulley with greater noise.

It is therefore an object of the present invention to provide a belt drive of the aforementioned general type that prevents a toothed belt from leaving the sides of a toothed pulley without utilizing the guide rib or guide groove of the heretofore known, self-guiding toothed belt, and that in so doing avoids the previous reduction of the force transfer surface caused by the known guide rib or groove.

BRIEF DESCRIPTION OF THE DRAWING

This object, and other objects and advantages of the present invention, will appear more clearly from the following specification in conjunction with the accompanying schematic drawing, in which:

FIG. 1 shows a first exemplary embodiment of the inventive configuration of the toothed belt of the belt drive;

FIG. 2 shows one advantageous exemplary embodiment of a toothed pulley of the belt drive that conforms to the toothed belt drive of FIG. 1;

FIG. 3 shows a second exemplary embodiment of the inventive toothed belt of the belt drive; and FIG. 4 shows an exemplary embodiment of a toothed pulley that conforms to the toothed belt of FIG. 3.

SUMMARY OF THE INVENTION

The belt drive of the present invention is characterized primarily in that: the teeth of the toothed belt are divided into at least two strip-like rows of teeth that are disposed next to one another, with each two adjacent rows of teeth being offset relative to one another in the longitudinal direction of the belt in such a way that the teeth of one of the rows are disposed at least partially laterally adjacent to the grooves between the teeth of the adjacent row; and the toothed pulley, in conformity with the number of rows of teeth of the toothed belt, is provided with at least two rows of teeth that are disposed next to one another and are staggered relative to one another in conformity with the offset of the rows of teeth of the belt.

Further specific features of the present invention will be described in detail subsequently.

DESCRIPTION OF PREFERRED EMBODIMENTS

Referring now to the drawing in detail, the toothed belt 1 illustrated in FIG. 1 is made of plastic or a similarly extrudable material, with an inextensible reinforcing insert 3 being embedded in the belt body 2 of the belt. The toothed belt 1 has a toothed side that comprises tooth ribs 4 and tooth grooves 5. In the illustrated embodiment, this toothed side of the belt is divided into three strip-like rows 6, 7, and 8 of teeth that are disposed next to one another. While the teeth of the two wider side strips 6 and 8 are aligned with one another in the transverse direction of the belt, the teeth of the narrower central row 7 are offset relative to the teeth of the two adjacent rows 6 and 8 in the longitudinal direction of the belt, i.e. in the direction of the tooth pitch, in such a way that the teeth 4a of the central row 7 are disposed at least partially laterally adjacent to the grooves 5 between the teeth of the two side rows 6 and 8. Similarly, the teeth 4b of the rows 6 and 8 are disposed laterally adjacent the grooves between the teeth of the row 7. The teeth 4a are advantageously offset relative to the teeth 4b by half of the tooth pitch, i.e. the distance between two successive teeth, so that the entire profile of each tooth is disposed laterally adjacent a groove of the adjacent row. By splitting the teeth of the belt into rows of teeth that are offset relative to one another, the force transfer surface of the belt teeth at the surfaces 9 of the teeth is not reduced, and at both ends of the teeth 4a of the central strip 7, as well at the adjacent ends of the teeth 4b of the side strips 6 and 8, guide surfaces 20 are formed that extend transverse to the teeth 4 and grooves 5. By means of these guide surfaces 20, the toothed belt is automatically guided on a correspondingly constructed toothed pulley, so that the pulley does not have to have any lateral flanges that project beyond the belt to prevent the belt from leaving from the side. As can be seen from FIG. 1, it would also be possible for the tooth belt to be provided with only two rows of teeth that are offset relative to one another in order, via the facing guide surfaces 20 of the two rows of teeth, to prevent the toothed belt from laterally leaving a correspondingly embodied toothed pulley from either side.

The toothed pulley 10 illustrated in FIG. 2 conforms to the toothed belt of FIG. 1. In conformity with the number of rows 6, 7, and 8 of teeth of the belt 1, the toothed pulley 10 comprises three pulley sections 11, 12, and 13 that are disposed next to one another and are connected with one another. In conformity with the teeth of the belt, these pulley sections 11 12 and 13 are staggered relative to one another, so that the guide surfaces 20, for example of the central row of teeth 7 of the belt 1, cooperate with the abutment surfaces 21 formed by the teeth of the two side pulley sections 11 and 13 to provide lateral guidance for the toothed belt 1.

Where the toothed belt has three or more rows of teeth, the width of the rows 6, 7, and 8 of teeth of the toothed belt 1, and the width of the sections 11, 12, and 13 of the toothed pulley 10, are coordinated with one another in such a way that a small predetermined gap exists in the transverse direction of the belt between the guide surfaces 20 on the teeth 4 on the one hand, and the guide or abutment surfaces 21 on the pulley teeth on the other hand, which guide surfaces 20 and 21 cooperate to provide the lateral guidance for the belt. This design ensures that the teeth of the belt and the teeth of the pulley do not wedge together on the guide surfaces 20 and 21, but rather can mesh in an unobstructed manner with one another to such an extent that, as designed, the head surfaces of the teeth of the belt, or the bases of the grooves between these teeth, rest upon the corresponding surfaces of the teeth of the pulley.

The embodiment of the toothed belt illustrated in FIG. 3 has five narrow rows 14 of teeth, with each two adjacent rows being offset relative to one another in the longitudinal direction of the belt by half of the tooth pitch. Each of the rows 14 preferably has the same width. In conformity therewith, the toothed pulley that is illustrated in FIG. 4 and conforms to the toothed belt of FIG. 3 comprises five pulley sections that are disposed next to one another and are offset relative to one another. This design of the toothed belt and the pertaining toothed pulley has the additional advantage, especially for great belt widths, that as the toothed belt rotates about the toothed pulley, the air can escape more easily and in a less obstructed manner from the grooves that respectively receive a tooth as a result of which less noise is generated as the belt rotates about the pulley.

The present invention is, of course, in no way restricted to the specific disclosure of the specification and drawing, but also encompasses any modifications within the scope of the appended claims.

What I claim is:

1. In a belt drive comprising a toothed belt and a toothed pulley, with said belt having a toothed side on which are formed guide surfaces that are disposed along at least one line that extends in the longitudinal direction of said belt, with said guide surfaces extending transverse to teeth and grooves of said belt, whereby when said belt rotates about said pulley, in order to provide lateral guidance for said belt said guide surfaces rest against corresponding abutment surfaces of said pulley that extend transverse to teeth of said pulley, the improvement wherein:

said teeth of said belt are divided into at least two strip-like rows of teeth that are disposed next to one another, with adjacent rows of teeth being offset relative to one another in the longitudinal direction of said belt in such a way that the teeth of one of said rows are disposed at least partially laterally adjacent to the grooves between the teeth of the adjacent row; and said pulley, in conformity with the number of rows of teeth of said belt, is provided with at least two rows of teeth that are disposed next to one another and are staggered relative to one another in conformity with the offset of said rows of teeth of said belt.

2. A belt drive according to claim 1, in which said belt has at least three rows of teeth, and said pulley has a corresponding number of rows of teeth, with the widths of said rows of belt teeth and pulley teeth being coordinated with one another in such a way that between cooperating ones of said guide surfaces of said belt teeth and said abutment surfaces of said pulley teeth a predetermined small gap exists in the transverse direction of said belt.

3. A belt drive according to claim 1, in which the teeth of two adjacent rows of teeth of said belt are offset relative to one another by half of the tooth pitch.

* * * * *